UNITED STATES PATENT OFFICE.

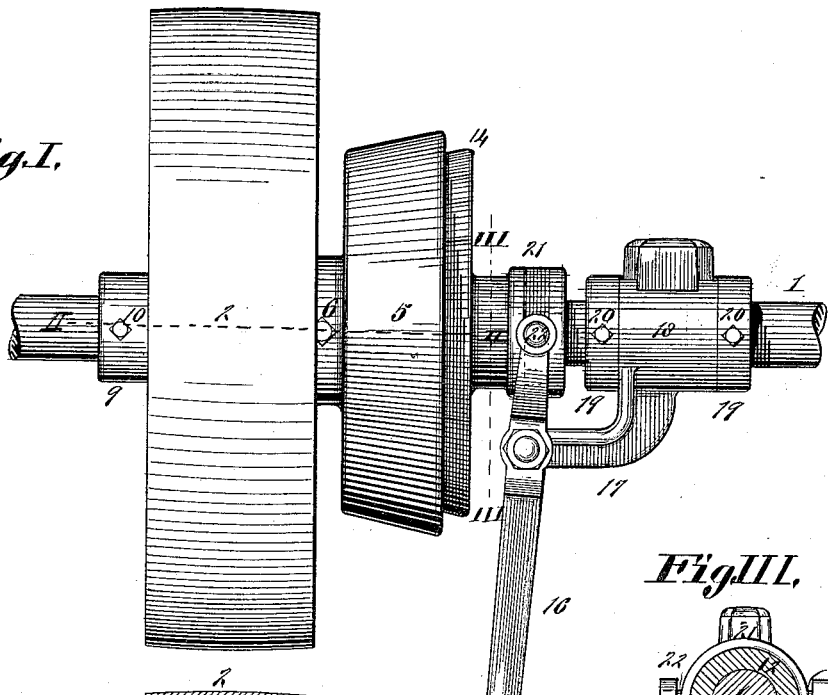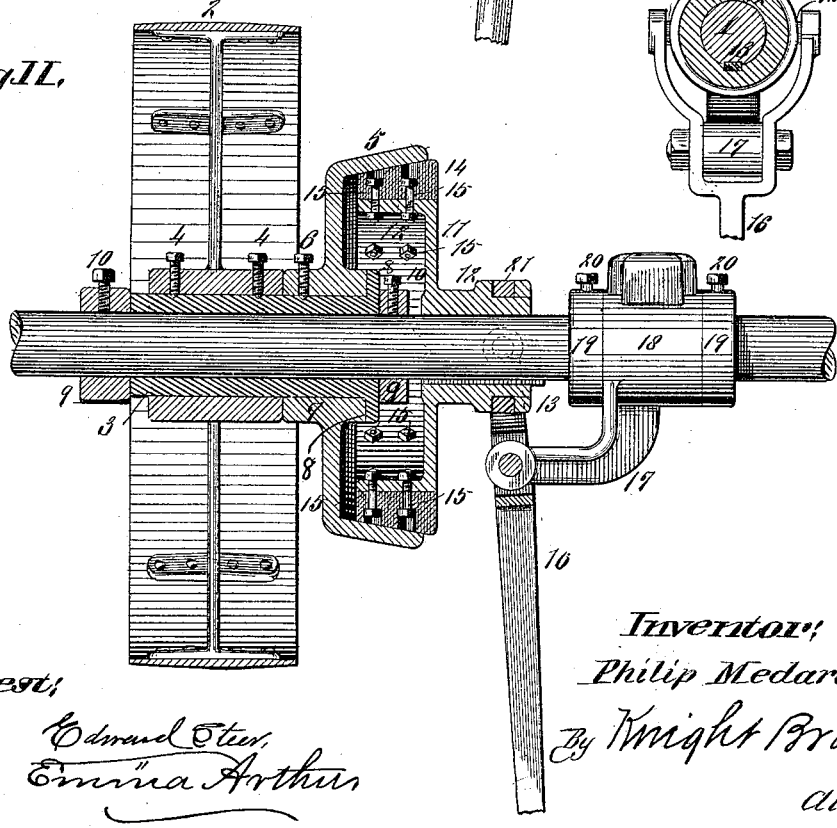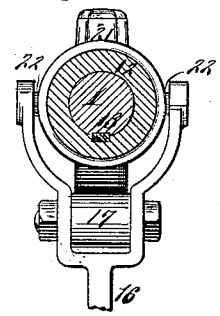

PHILIP MEDART, OF ST. LOUIS, MISSOURI.

FRICTION-CLUTCH.

SPECIFICATION forming part of Letters Patent No. 364,945, dated June 14, 1887.

Application filed March 12, 1887. Serial No. 230,724. (No model.)

*To all whom it may concern:*

Be it known that I, PHILIP MEDART, of the city of St. Louis, in the State of Missouri, have invented a certain new and useful Improvement in Friction-Clutches, of which the following is a full, clear, and exact description, reference being had to the accompanying drawings, forming part of this specification, and in which—

Figure I is a side elevation of my improved clutch, showing also a pulley and part of a shaft. Fig. II is a longitudinal section through the shaft and clutch taken on line II II, Fig. I. Fig. III is a transverse section through the clutch and shaft, taken on line III III, Fig. I.

My invention relates to certain improvements in friction-clutches; and it consists in features of novelty hereinafter fully described, and pointed out in the claims.

Referring to the drawings, 1 represents a shaft, and 2 a pulley loosely mounted on the shaft. The pulley does not have journal-bearing directly on the shaft, but there is interposed between them a sleeve or bushing, 3, as shown in Fig. II, to which the pulley is secured by screws 4, or by other suitable means.

5 represents the fixed part of the clutch, which is cup-shaped, as shown, and which is mounted upon the sleeve or bushing 3, and secured thereto by a screw, 6, or by other suitable means. This part of the clutch has a hub, 7, through which the screw 6 passes, and within the hub on the sleeve 3 is preferably formed a flange, 8, between which and the pulleys 2 the fixed part of the clutch fits. The sleeve is prevented from slipping on the shaft by means of collars 9, provided with set-screws 10.

By the use of the sleeve 3 it will be seen that any ordinary pulley may be used, as it is not necessary for it to be provided with means for the attachment to it of the fixed part 5 of the clutch, the sleeve serving to connect this part of the clutch and pulley together, and as it is inexpensive it may be cheaply replaced when worn out.

11 represents the movable part of the clutch, having a hub, 12, fitting over the shaft, and having feather-and-groove connection therewith, as shown at 13, Figs. II and III. This part of the clutch consists of a disk having a marginal flange, 12, to which is bolted a ring, 14, of wood placed with the grain running in the direction of the length of the disk. This ring is secured to the flange 12 of the disk by means of bolts 15; and it will be seen that when the movable part of the disk is forced toward the fixed part the friction between the fixed part and the ring 14 will cause the fixed part and the pulley to be turned with the movable part 11 of the clutch, which (as stated) is connected to the shaft and turns with it. The part 11 of the clutch is moved lengthwise of the shaft by means of a lever, 16, fulcrumed to an arm, 17, formed upon or secured to a collar, 18, fitting on the shaft and held from end movement by means of rings 19, provided with set-screws 20. The lever is bifurcated at its inner end, as shown in Fig. III, and is connected, by means of a ring, 21, and pins 22, to the hub of the part 11 of the clutch, the ring 21 fitting in a groove of the hub, as shown in Fig. II. It will thus be seen that the fulcrum of the operating-lever 16 is connected to the shaft; and the object of this is that when the lever is operated to engage the clutch the strain has no tendency to move the shaft endwise, as is the case where the lever is secured to a fulcrum having no connection with the shaft. When the lever is moved with the arrangement, as I have shown it, the strain in one direction on the shaft is counteracted by a like strain in the other direction—that is to say, the tendency to move the shaft in the direction in which the disk 11 moves, as the clutch is engaged, is counteracted by the pressure of the fulcrum, which tends to move the shaft in the other direction. Moreover, by forming the fulcrum on the shaft the device can be applied easier and cheaper than where the fulcrum having no connection with the shaft is used, for the reason that it is often difficult to secure a support for such fulcrum.

I claim as my invention—

1. The combination of the pulley, the sleeve having a flange at one end, and to which the pulley is secured by screws, the clutch consisting of a fixed part fitting between said pulley and flange and connected to said sleeve by a set-screw, and a movable part, collars 9, for holding the sleeve from end movement on the shaft, and the lever for operating the movable part of the clutch, substantially as and for the purpose set forth.

2. In combination with a shaft, a pulley and a clutch mounted on the shaft, the latter having a fixed and circumferentially-grooved movable part, a fulcrum secured to the shaft, and consisting of a collar, 18, and arm 17, lever pivoted to the arm, a ring, 21, fitting in the groove of the movable part, and pivotal connection between the ring and lever, substantially as set forth.

PHILIP MEDART.

In presence of—
GEO. H. KNIGHT,
EDW. S. KNIGHT.